(12) United States Patent
Rauber et al.

(10) Patent No.: US 9,327,756 B2
(45) Date of Patent: May 3, 2016

(54) STEERING COLUMN FOR MOTOR VEHICLE

(71) Applicant: THYSSENKRUPP PRESTA AKTIENGESELLSCHAFT, Eschen (LI)

(72) Inventors: Adrian Rauber, Unterwasser (CH); Thomas Raich, Vandans (AT)

(73) Assignee: THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 0 days.

(21) Appl. No.: 14/404,182

(22) PCT Filed: Mar. 5, 2013

(86) PCT No.: PCT/EP2013/000632
§ 371 (c)(1),
(2) Date: Nov. 26, 2014

(87) PCT Pub. No.: WO2013/178302
PCT Pub. Date: Dec. 5, 2013

(65) Prior Publication Data
US 2015/0135882 A1    May 21, 2015

(30) Foreign Application Priority Data

May 30, 2012 (DE) .......................... 10 2012 104 644

(51) Int. Cl.
*B62D 1/185*    (2006.01)
*B62D 1/181*    (2006.01)
*B62D 1/187*    (2006.01)

(52) U.S. Cl.
CPC ................ *B62D 1/185* (2013.01); *B62D 1/181* (2013.01); *B62D 1/187* (2013.01)

(58) Field of Classification Search
CPC ......... B62D 1/181; B62D 1/187; B62D 1/185
See application file for complete search history.

(56) References Cited

U.S. PATENT DOCUMENTS 5,743,150 A * 4/1998 Fevre et al. ..................... 74/493
7,325,833 B2 * 2/2008 Sawada et al. ................ 280/775
(Continued)

FOREIGN PATENT DOCUMENTS

| DE | 102010037312 B3 | 1/2012 |
| EP | 0281723 A2 | 9/1988 |
| JP | H06 286620 A | 10/1994 |
| JP | 2011-121440 A | 6/2011 |

OTHER PUBLICATIONS

German Language International Search Report for International patent application No. PCT/EP2013/000632; mailing date Jun. 7, 2013.

(Continued)

*Primary Examiner* — Drew Brown
(74) *Attorney, Agent, or Firm* — ThyssenKrupp North America, Inc.

(57) ABSTRACT

Steering column for a motor vehicle having a column tube for rotatably mounting a steering spindle and having a carrier body which engages around the column tube, at least in certain areas, wherein the column tube is mounted in the carrier body so as to be slidable at least in a longitudinal direction of the steering spindle, wherein the steering column has at least one leaf spring which presses against a cylindrical-column-shaped section of the column tube, in a transverse direction orthogonally with respect to the longitudinal direction of the steering spindle, wherein the leaf spring has at least two support faces which are spaced apart from one another in the circumferential direction (10) of the column tube, with which supports faces said leaf spring presses against the column tube directly or with the interposition of at least one bearing body, wherein both during the direct pressing and during pressing with the interposition of the bearing body, the leaf spring presses against the column tube exclusively with its side facing the column tube.

13 Claims, 5 Drawing Sheets

(56) References Cited

U.S. PATENT DOCUMENTS

| | | | |
|---|---|---|---|
| 7,354,069 B2* | 4/2008 | Yamada | 280/775 |
| 7,607,694 B2* | 10/2009 | Shinohara et al. | 280/775 |
| 7,726,691 B2* | 6/2010 | Yamada | 280/775 |
| 8,256,322 B2* | 9/2012 | Takezawa et al. | 74/493 |
| 8,550,497 B2* | 10/2013 | Takezawa et al. | 280/775 |
| 2005/0066761 A1 | 3/2005 | Arihara | |
| 2005/0225068 A1* | 10/2005 | Ishida et al. | 280/775 |
| 2009/0044657 A1* | 2/2009 | Osawa et al. | 74/493 |
| 2011/0175335 A1 | 7/2011 | Takezawa | |
| 2011/0203403 A1* | 8/2011 | Maniwa et al. | 74/493 |
| 2012/0198956 A1* | 8/2012 | Takezawa et al. | 74/493 |

OTHER PUBLICATIONS

English Translation of International Search Report for International patent application No. PCT/EP2013/000632; mailing date Jun. 7, 2013.

English translation of the abstract of JP H06 286620 (A).

English translation of the abstract of EP 0281723 (A2).

English translation of the abstract of JP 2011-121440 (A).

English translation of the abstract of DE 102010037312 (B3).

* cited by examiner

STEERING COLUMN FOR MOTOR VEHICLE

CROSS REFERENCE TO RELATED APPLICATIONS

This application is a U.S. National Stage Entry of International Patent Application Serial Number PCT/EP2013/000632, filed Mar. 5, 2013, which claims priority to German patent application no. 102012104644.1, filed May 30, 2012.

FIELD

The present disclosure relates to a steering column for a motor vehicle

BACKGROUND

Steering columns of the generic type are therefore embodiments of steering columns in which the steering spindle which supports the steering wheel can be adjusted in its position at least in the longitudinal direction, in order to adapt the position of the steering wheel to the size of the vehicle driver. However, in steering columns of this generic type, the position of the steering spindle is adjusted at least in the longitudinal direction by means of a motor-operated longitudinal adjustment drive. As a rule, such steering columns do not have a separate locking mechanism which, in its closed position, secures the steering spindle in its position which has been set. In these cases, the position is fixed by means of the motor-operated adjustment mechanism.

In general, in such steering columns of the generic type, it is desired that, on the one hand, the adjustment in the longitudinal direction of the steering spindle can occur in an easily moving fashion, that is to say with small motor forces of the motor-operated longitudinal adjustment drive. However, on the other hand, a high degree of freedom from play needs to be provided. The freedom from play in the longitudinal direction of the steering spindle is generally achieved through the connection of the steering spindle to the motor-operated longitudinal adjustment drive. However, in order to achieve the desired position of the column tube with play with respect to the carrier body, additional measures are generally necessary in the transverse direction orthogonally with respect to the longitudinal direction of the steering spindle. JP 06286620 A of the generic type therefore discloses a sliding compound between two tube parts of an electrically adjustable steering column in which a spring mechanism acts on a planar circumferential section of the interior column tube, wherein this interior column tube applies spring prestress to planar surface sections in the carrier body which are arranged in a V shape. However, this technical solution requires a large number of individual components, is costly to realize and limits the design of the column tubes.

In JP 2011-121440 A, a sleeve which to a greater or lesser extent completely surrounds the column tube is arranged between the column tube and the carrier body in order to eliminate play between the column tube and the carrier body and thus prevent rattling noises. A disadvantage of this arrangement is that the mounting of the components in this design is relatively complex.

US 2005/0066761 A1 shows a motor-adjustable steering column in which a leaf spring is arranged in the longitudinal direction of the steering spindle and presses against the column tube via blocks which are arranged in the transverse direction. DE 10 2010 037 312 B3 presents a steering column which is only manually adjustable and in which a leaf spring is provided for forcing wedge-shaped bodies in the circumferential direction between the column tube and the carrier body.

BRIEF DESCRIPTION OF THE DRAWINGS

The present disclosure is described in detail below with reference to the attached drawing figures, wherein.

DETAILED DESCRIPTION

Disclosed herein is a steering column for a motor vehicle having a column tube for rotatably mounting a steering spindle of the steering column and having a carrier body which engages around the column tube at least in certain areas, wherein the column tube is mounted in the carrier body so as to be slidable at least in a longitudinal direction of the steering column, wherein the steering column has at least one leaf spring which presses against a cylindrical-column-shaped section of the column tube in a transverse direction orthogonally with respect to the longitudinal direction of the steering spindle.

An object of the present disclosure is to provide a steering column in which a play-free position of the column is made possible between the column tube and the carrier body using simple means.

There is therefore provision that the leaf spring has at least two support faces which are spaced apart from one another in the circumferential direction of the column tube, with which support faces said leaf spring presses against the column tube directly or with the interposition of at least one bearing body, wherein both during the direct pressing against the column tube and during pressing against the column tube with the interposition of the bearing body, the leaf spring presses against the column tube exclusively with its side facing the column tube.

The invention is preferably applied for steering columns in which the column tube is mounted in the carrier body so as to be slidable at least in a longitudinal direction of the steering spindle by means of a motor-operated longitudinal adjustment drive of the steering column.

By loading the column tube by means of the contact pressure of the leaf spring in the transverse direction orthogonally with respect to the longitudinal direction of the steering spindle, it is easily ensured that the column tube is forced against the carrier body which surrounds the column tube, as a result of which the desired play-free position is achieved in the transverse direction. There is provision here that the leaf spring presses onto a cylindrical-column-shaped section of the column tube, which in turn permits a very simple design of the column tube. In particularly simple configurations of the invention, the leaf spring can press directly onto the column tube, that is to say can make direct contact with the column tube in its cylindrical-column-shaped section. However, indirect pressing of the leaf spring against the specified cylindrical-column-shaped section of the column tube is also possible. For example, corresponding configurations of the invention provide that the leaf spring presses against the column tube with the interposition of at least one bearing body. The bearing body can be constructed, for example, from plastic, for example as an injection moulded part. Preferred variants provide that the leaf spring presses against the column tube with the interposition of two bearing bodies which are arranged spaced apart from one another. In this context, it is to be particularly preferred if the two bearing bodies are connected to a connecting section to form one component, a bearing element. In particular, the bearing bodies and the connecting section can be manufactured as a single common part, preferably in an injection moulding method. For the purpose of optimum, positively locking adaptation to the cylindrical-column-shaped section of the column tube, the bearing bodies can be embodied at least in certain areas in a wedge shape in cross section. It is particularly advantageous if at least one surface which is curved in certain areas in a cylindrical column shape, for bearing against the column tube, is provided on the bearing body. In a combination of these two preferred variants, the bearing body is then wedge-shaped in certain areas in cross section, wherein at least one of its surfaces is curved in a cylindrical column shape in order to bear against the column tube. For the purpose of simplifying the mounting, the leaf spring is held in the single-part bearing element by means of laterally arranged clips. These clips can also be embodied directly together with the bearing bodies and the connecting section in an injection moulding method.

Generally, it is advantageous if the leaf spring presses against the column tube at least two points or areas which are spaced apart from one another in the circumferential direction of the column tube. It is in turn advantageous in this context if the leaf spring presses against the column tube with its support faces, spaced apart from one another in the circumferential direction of the column tube, at the points which are spaced apart from one another in the circumferential direction of the column tube. One of the specified bearing bodies can then be respectively arranged at each of these points or areas which are spaced apart from one another in the circumferential direction of the column tube. In such embodiments, the bearing bodies are, as stated above, preferably connected to one another and more preferably pre-assembled with the leaf spring as an assembly.

For the sake of a design which is as simple as possible, preferred embodiments of the invention provide that the column tube rests, on the side facing the leaf spring, on the carrier body exclusively with interposition of a lubricant film. In these variants, the leaf spring therefore presses the column tube, on the side facing the leaf spring, directly against the carrier body. However, this occurs with the interposition of a lubricant film in order to implement the longitudinal adjustment in the longitudinal direction of the steering spindle by means of the motor-operated longitudinal adjustment drive with as little application of force as possible.

For the sake of mounting which is as simple as possible, particularly preferred variants of the invention provide that the leaf spring is arranged in an opening in the carrier body, wherein, for the purpose of mounting, the leaf spring can be introduced from the outside through the opening and pressed against the column tube. This makes it possible firstly to introduce the column tube into the carrier body and then to press the leaf spring from the outside through the opening against the column tube. In this context, the leaf spring can be supported, on its side facing away from the column tube, by means of at least one bolt or at least one screw. In particular when a screw is used, it is possible here, for the purpose of setting the prestress, to configure the screw to be adjustable in the specified transverse direction. Of course, it is basically also possible to set the prestress by means of a bolt which can be adjusted in the transverse direction. A preferred method for mounting the leaf spring in the steering column according to the invention therefore provides that the leaf spring is arranged in an opening in the carrier body, wherein, for the purpose of mounting, the leaf spring is introduced from the outside through the opening and pressed against the column tube. In this context, the leaf spring can be mounted through the opening as an assembly together with the bearing bodies specified above or the bearing element specified above. If bearing bodies are used, it is, however, also possible for these to be firstly introduced from the outside through the opening and positioned against the column tube separately from the leaf spring, in order then subsequently to carry out the mounting of the leaf spring in the specified fashion.

In order to permit the specified mounting in the opening in the carrier body, there is preferably provision that the leaf spring is arranged in an opening in the carrier body, wherein an opening face of the opening is at least as large as the leaf spring. There is preferably provision that the opening in the carrier body is bounded exclusively by walls which are parallel to one another. Preferred embodiments of the invention also provide that the leaf spring extends over half the circumference of the column tube at maximum. The leaf spring particularly preferably extends over at most a quarter of the circumference of the column tube, since this has permitted good support to be achieved.

The circumference of the column tube is to be used here in the area of the cylindrical-column-shaped section of the column tube in which the leaf spring also presses against the column tube.

In contrast to manually adjustable steering columns, in steering columns according to the invention, in which the column tube is slid in the carrier body in the longitudinal direction of the steering spindle by means of a motor-operated longitudinal adjustment drive, there is provision that the locking of the steering spindle in the longitudinal direction is implemented without the tensioning between the carrier body and the column tube, which is customary in the case of manually adjustable steering columns. In this context, preferred embodiments of the invention therefore provide that the column tube is held in the respectively set position in the longitudinal direction of the steering spindle preferably exclusively by the motor-operated longitudinal adjustment drive. In steering columns of the generic type, the locking mechanisms which are known in the case of manually adjustable steering columns are therefore generally dispensed with. Correspondingly, the fixing of the position which can be set in the longitudinal direction is preferably carried out exclusively by means of the motor-operated adjustment mechanism and not by means of tensioning between the carrier body and the column tube.

For the sake of completeness, it is also to be noted that the column tube favourably partially or entirely surrounds the steering spindle. The steering spindle is mounted in the column tube so as to be rotatable about its longitudinal axis or longitudinal direction, in order to be able to transmit a steering movement of the steering wheel to the wheels of the motor vehicle. In order to adjust the position of the steering spindle in the longitudinal direction, the latter is slid in the carrier body together with the column tube by the motor-operated longitudinal adjustment drive. The carrier body can engage around the column tube in certain areas or completely. For this purpose, the carrier body can have a corresponding cavity in which the column tube is slideably mounted. Said carrier body advantageously has a cylindrical cavity for accommodating the column tube. The column tube and the steering spindle are then directly or indirectly attached to the bodywork of the vehicle via the carrier body. With respect to the longitudinal direction of the steering spindle, it is to be noted for the sake of completeness that this is the direction of the longitudinal extent of the steering spindle. The rotational axis about which the steering spindle is mounted in a rotatable fashion in the column tube generally extends in this longitudinal direction. The motor-operated longitudinal adjustment drive is usually composed of multiple parts. Said longitudinal adjustment drive can comprise, for example, a motor, in particular an electric motor, a transmission and/or a spindle which is driven by the motor together with the transmission. For example the column tube can then be attached to this spindle.

For the sake of completeness, it is to be noted that steering columns according to the invention can, of course, be adjustable not only in the longitudinal direction of the steering spindle but also in other directions, for example in the vertical direction. For the purpose of vertical adjustment, for example a motor-operated vertical adjustment drive can then be provided.

Figure 1:
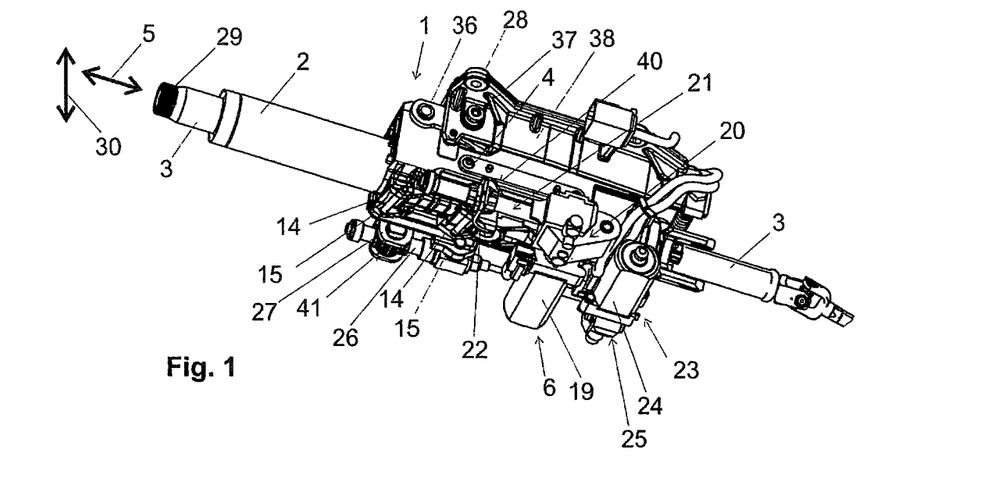
FIG. 1 is a perspective view of an embodiment of a steering column of the present disclosure.

FIG. 1 shows a perspective illustration of the first exemplary embodiment according to the invention of a steering column 1 obliquely from below. The steering spindle 3 is elongated in the longitudinal direction 5 and mounted in the column tube 2 so as to be rotatable about a rotational axis running in this longitudinal direction 5. A steering wheel (not illustrated) can be attached to the steering wheel connection 29 of the steering spindle 3 in a manner known per se. On the side lying opposite the steering wheel connection 29, the steering spindle 3 leads, with the interposition of a universal joint, to a steering transmission (not illustrated further) which generally acts on the front wheels of the motor vehicle. The steering column 1 is attached to a bodywork (not illustrated) of a motor vehicle by means of the attachment clips 28 which are arranged on a securing bracket 38. The column tube 2 is mounted in the carrier body 4 so as to be slidable in the longitudinal direction 5. However, sliding of the column tube 2 and steering spindle 3 relative to the carrier body 4 in the longitudinal direction 5 is carried out exclusively by means of the motor-operated longitudinal adjustment drive 6. As a result, if no adjustment is performed, the column tube 2 is also secured by the motor-operated longitudinal adjustment drive 6, in its position viewed in the longitudinal direction 5. In the exemplary embodiment shown, the motor-operated longitudinal adjustment drive 6 comprises an electric motor 19, a transmission 20 and a spindle 21. A threaded nut 40 of the longitudinal adjustment drive 6 is attached to the column tube 2 by means of the flange 22. In order to adjust the column tube 2 in the longitudinal direction 5 relative to the carrier body 4, the motor 19 slides the threaded nut 40 by means of the transmission 20 via the spindle 21, and therefore also slides the flange 22 and the column tube 2 in the longitudinal direction 5. In this context, the column tube 2 can both be extended, together with the steering spindle 3, from the carrier body 4 in the direction of the vehicle driver (not illustrated here), as well as retracted in the opposing direction.

In this first exemplary embodiment, the column tube 2 is, however, adjustable not only in the longitudinal directions 5 but also in the vertical directions 30. For this adjustment, the motor-operated vertical adjustment drive 23 is provided. The latter comprises in turn a motor 24, a transmission 25, a spindle 26 and a pivoting lever 27. The pivoting lever is mounted in the carrier body so as to be rotatable with an axle 36 and is mounted in the securing bracket 38 so as to be rotatable with an axle 37. By rotating the spindle 26, the motor 24 moves, via the transmission 25, a threaded nut 41 which is coupled to the pivoting lever 27, which leads to a pivoting movement of the pivoting lever 27 and then leads in a manner known per se to a vertical adjustment of the column tube 2 together with the steering column 3 in one of the vertical directions 30.

Figure 2:
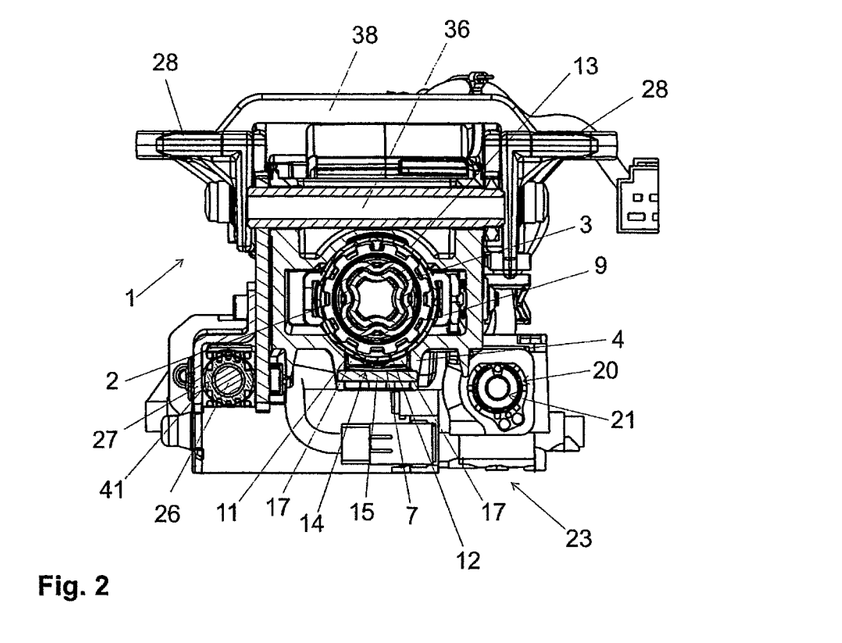
FIG. 2 is a front side plan view of the steering column of FIG. 1.

FIG. 2 shows a view in cross section, orthogonally with respect to the longitudinal axial direction 5, from behind, that is to say from the steering wheel side towards the steering column 1 according to FIG. 1. Here, it is already apparent that the column tube 2 is pressed against the carrier body 4 by the leaf spring 7 in a transverse direction 8 orthogonally with respect to the longitudinal direction 5. The transverse direction 8 can correspond to the radial direction. However, as here, it can also differ therefrom. However, it always runs orthogonally with respect to the longitudinal direction 5. The leaf spring 7 is arranged in an opening 14 in the carrier body 4 and is supported on the side opposite the column tube 2, by a bolt 15 which is attached to the carrier body 4.

In the exemplary embodiment shown, the leaf spring 7 does not press directly onto the points or areas 11 and 12 of the cylindrical-column-shaped section 9 of the column tube 2 which are spaced apart from one another in the circumferential direction. In this exemplary embodiment there is instead provision that the leaf spring 7 presses against the cylindrical-column-shaped section 9 of the column tube 2 with the interposition of a bearing element comprising two bearing bodies 17 which are embodied in a wedge shape. On the side facing the leaf spring 7, the column tube 2 bears directly against the carrier body 4, exclusively with the interposition of a lubricant film 13.

Figure 3:
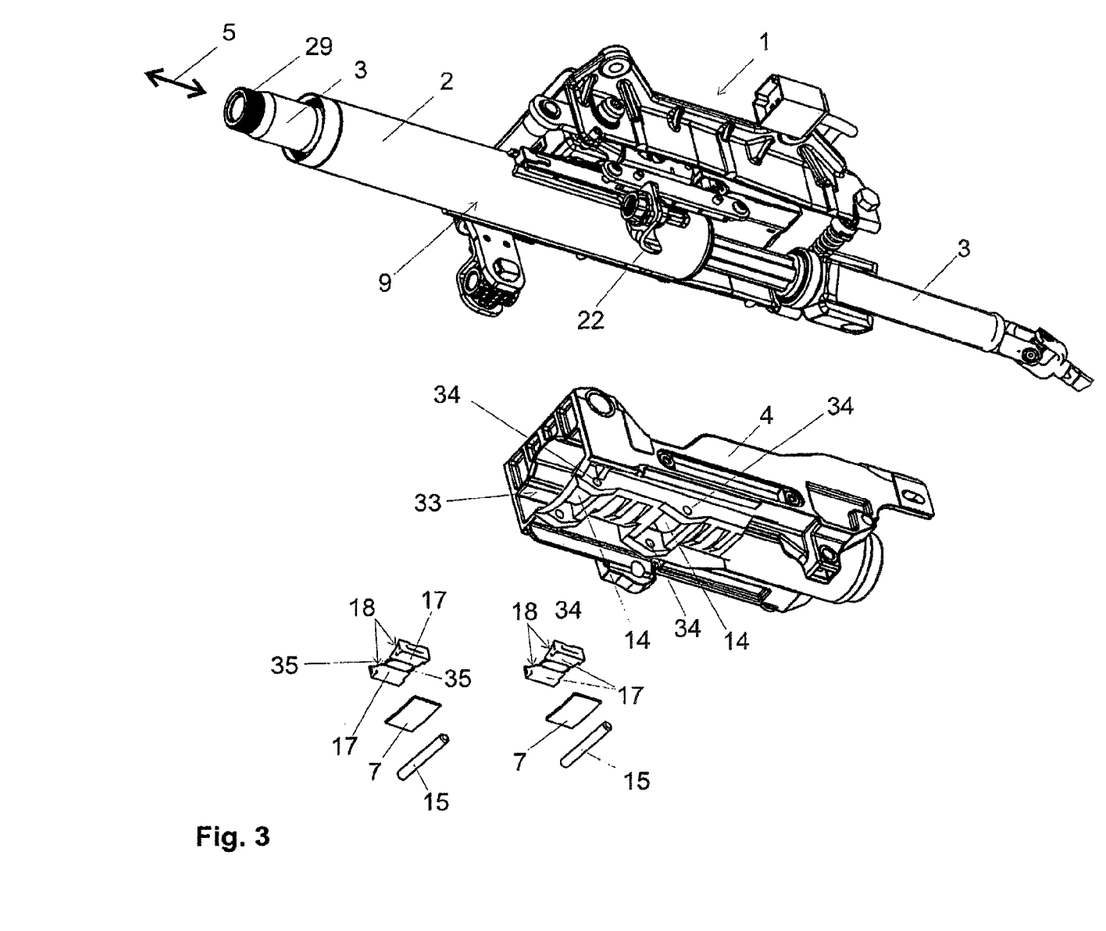
FIG. 3 is a perspective exploded view of the steering column of FIG. 1.

FIG. 3 shows an exploded illustration of the steering column of the first exemplary embodiment, but a number of components are omitted. The carrier body 4 with its cavity 33, which is cylindrical-column-shaped at least in certain areas and in which the column tube 2 is mounted so as to be slidable in the longitudinal direction 5, can be clearly seen. The cylindrical-column-shaped section 9 against which the leaf spring 7 presses with the interposition of the bearing body 17 can also be clearly seen in this illustration. The openings 14 in the carrier body 4, through which the leaf springs 7 together with the bearing bodies 17 can be mounted from the outside, in order then to press against the cylindrical-column-shaped section 9, can also be clearly seen. The attachment of the leaf springs 7 in the openings 14 is carried out in this first exemplary embodiment by means of the bolts 15 which are fixed in the corresponding receptacles 34 in the carrier body 4.

Figure 4:
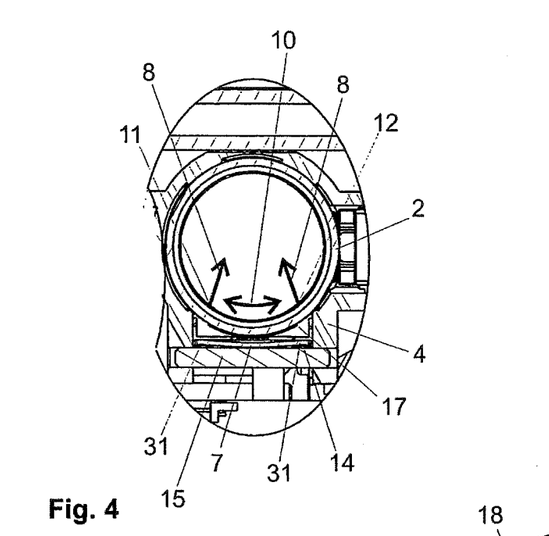
FIGS. 4-6 are detail views of various aspects of the steering column of FIG. 1.
Figure 5:
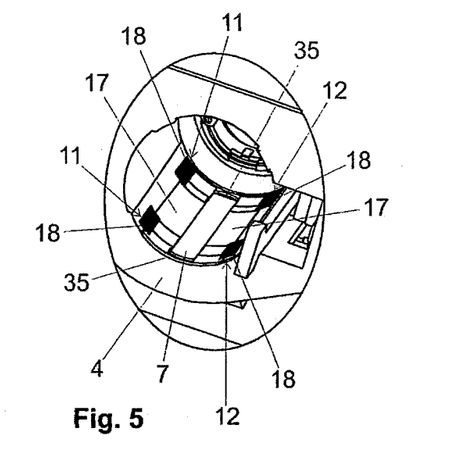

FIG. 4 shows in an enlarged form how the leaf spring 7 presses against the column tube 2 in the transverse direction 8 orthogonally with respect to the longitudinal direction 5, with the interposition of the bearing bodies 17, at the points or areas 11 and 12 which are spaced apart from one another in the circumferential direction 10. On the side facing away from the column tube 2, the leaf spring 7 is supported on the bolt 15. The leaf spring 7 presses onto the bearing bodies 17 at the corresponding points or areas 11 and 12 which are spaced apart from one another in the circumferential direction. The bearing bodies 17 are, as can be clearly seen in FIG. 4, embodied in a wedge shape in cross section and have surfaces 18 which are curved in a cylindrical column shape, for bearing against the column tube 2 or the cylindrical-column-shaped section 9 thereof. The latter can be particularly well seen in FIG. 5. From this illustration it is also clear that in this preferred exemplary embodiment the bearing bodies 17 can be combined with a connecting section, for example in the form of the connecting webs 35, to form a coherent component. This facilitates the mounting.

Figure 6:
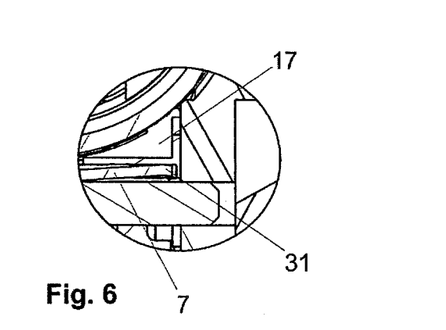

As is already apparent from FIG. 4, in this exemplary embodiment, the leaf spring 7 presses against the respective bearing bodies 17 in the areas just before their ends 31, and said leaf spring 7 is supported on the bolt 15 in the area between said bearing bodies 17, in the centre here. FIG. 6 shows in an enlarged form that in preferred embodiments, the ends 31 of the leaf spring 7 are bent somewhat in the direction away from the bearing body 17. This results in a situation in which no sharp edges, which could lead to the leaf spring 7 cutting into the bearing body 17, are present in the area of the support of the leaf spring 7 on the bearing body 17. Of course, correspondingly bent ends 31 can be employed to form rounded support faces even in exemplary embodiments in which bearing bodies 17 are dispensed with and the leaf spring 7 presses directly onto the column tube 2.

Figure 7:
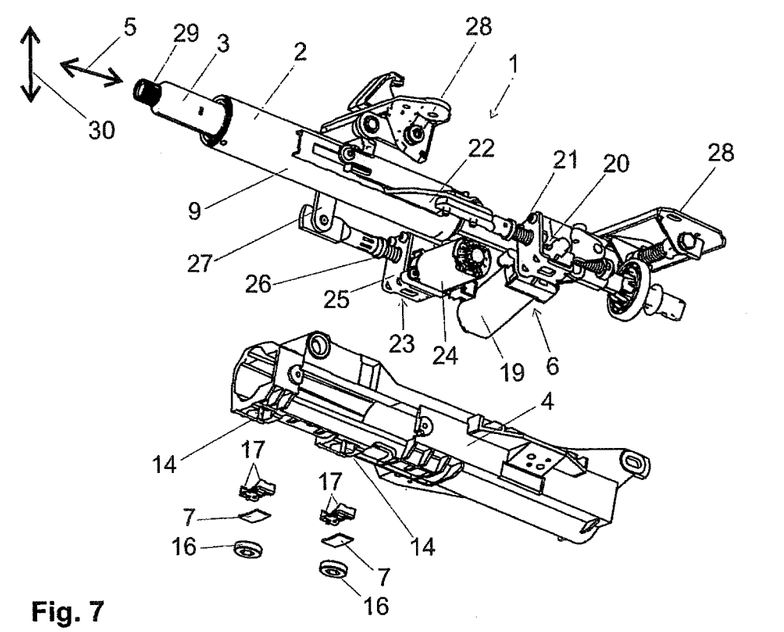
FIG. 7 is a perspective exploded view of an alternate embodiment of a steering column of the present disclosure.
Figure 8:
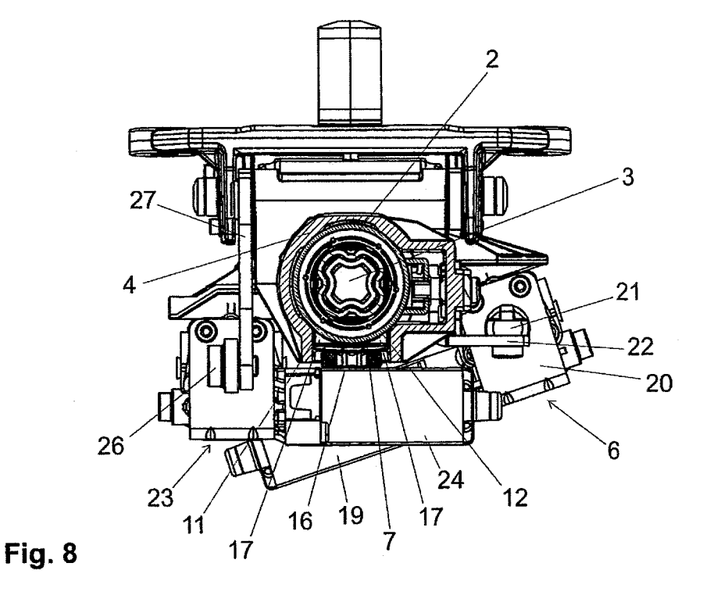
FIG. 8 is a front side plan view of the steering column of FIG. 7.
Figure 9:
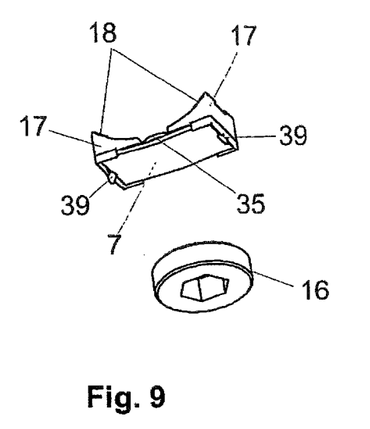
FIG. 9 is a perspective exploded view of a leaf spring assembly of the present disclosure.

FIGS. 7 to 9 show a second exemplary embodiment of the invention in which a screw 16 is provided instead of the bolt 15 for providing the leaf spring 7 with support on the rear side. The screw 16 is screwed into a corresponding thread in the carrier body 4 in the region of the opening 14. By correspondingly screwing in one or other direction, it is possible in this exemplary embodiment to set the prestress of the leaf spring 7, and therefore the forces with which the column tube 2 is pressed against the carrier body 4. In accordance with this secondary exemplary embodiment, the adjustment transmissions 20, 25 are modified with respect to the first exemplary embodiment. However, the effect corresponds substantially to the effect of the first exemplary embodiment, with the result that reference can be made to the description of the first exemplary embodiment for further details of this variant. The significant difference is that, in the first exemplary embodiment, the spindles 21, 26 are rotated and as a result the threaded nuts 40, 41 are slid, while in this exemplary embodiment, the threaded nuts, which in this case are arranged in the transmissions 20 and 25, are rotated and as a result the spindles 21, 26 are slid. It is obvious that the various transmission variants can be freely combined with the variants according to the invention of the construction for avoiding play. FIG. 7 shows in any case an exploded view which is similar to FIG. 3. FIG. 8 shows a view in cross section, viewed from behind—the steering-wheel-side end of the steering column—analogously to FIG. 2. FIG. 9 illustrates the component composed of the bearing element which comprises the two bearing bodies 17 which are connected to one another by means of the connecting webs 35, and which holds the leaf spring 7 with the clips 39, as well as the screw 16. With respect to the two first exemplary embodiments, reference is also made here to the fact that the leaf spring 7 is embodied in each case in a rectangular shape in a plan view. Furthermore, said leaf spring 7 is smaller in area than the opening 14, with the result that the leaf spring can be inserted into the opening 14, as can also the bearing bodies 17.

Figure 10:
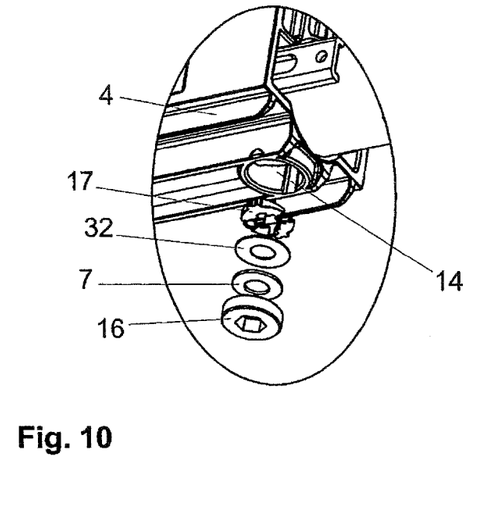
FIG. 10 is a perspective partial exploded detail view of an alternate embodiment of a ring shaped leaf spring as disclosed herein.

FIG. 10 shows an alternative to FIG. 9. In FIG. 10, the leaf spring 7 is embodied in the form of a ring and not in a rectangular shape. In this embodiment variant, the interposition of a washer 32 prevents edges of the leaf spring 7 from being able to dig into the bearing bodies 17 made of plastic which are also joined together here by means of connecting webs 35. In the exemplary embodiment according to FIG. 10, the prestress of the leaf spring 7 can also be set by means of the screw 16.

Figure 11:
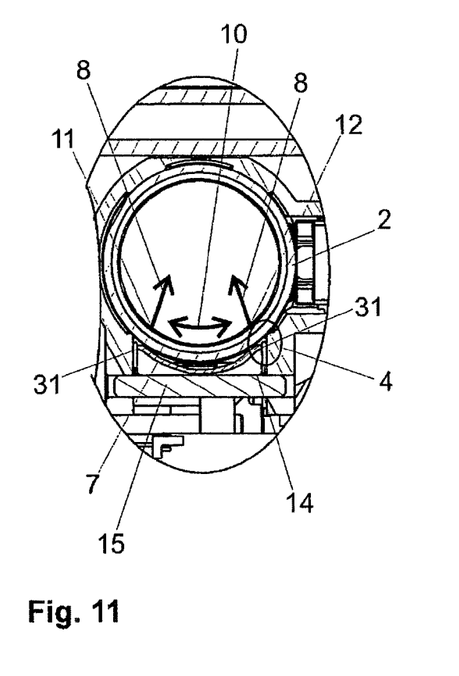
FIG. 11 is a detail view of an embodiment of the steering column of the present disclosure without bearing bodies.
Figure 12:
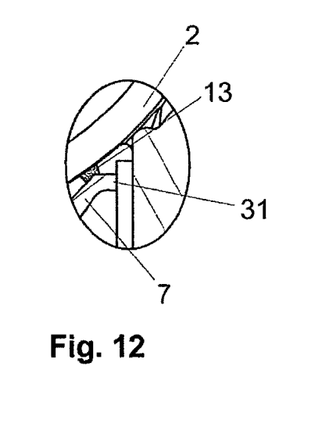
FIG. 12 is a further detail view of an aspect of the steering column of FIG. 11.

FIG. 11 and FIG. 12 illustrate an embodiment of the invention without bearing bodies. The design otherwise corresponds substantially to the example as is shown in FIG. 4. In the design without bearing bodies, the leaf spring 7 bears directly on the surface of the column tube 2, at the areas 11, 12 which are spaced apart in the circumferential direction. In this context, it is possible, as illustrated in FIG. 12, to provide a lubricant film 13 for reducing friction.

Greases or else solid lubricants can be used as the lubricants. However, surface treatment, in particular surface coating of one of the surfaces in contact can also be provided.

As a result of the pressing according to the invention of the leaf spring against the cylindrical column-shaped section of the column tube and the freedom from play which is achieved as a result, optimum support of the column tube 2 in the carrier body 4 is achieved with extremely simple means. This also leads to a reduction in migration of the column tube during the adjustment in the directions perpendicular to the longitudinal direction 5 of the steering column 1. It is particularly advantageous here if the distance between the points or areas 11 and 12 are selected to be as large as possible. The points or areas 11 and 12 should advantageously be arranged symmetrically here with respect to a plane in which the longitudinal direction 5 runs. The leaf spring ensures, through its elasticity, that unevennesses in the system are compensated. In this context, the use of the leaf spring is also advantageous because it makes relatively long spring travel available with extremely simple means, and furthermore, given a corresponding design, the leaf spring does not dig into the bearing bodies 17 either. In addition, with a leaf spring 7, the force can be applied to the column tube 2 selectively at the desired points or areas 11 and 12. The use of a bolt 15 in the form of an aligning pin is a particularly economical solution.

In all the exemplary embodiments according to the invention shown there is provision that the leaf spring 7 has at least two support faces which are spaced apart from one another in the circumferential direction 10 of the column tube, with which support faces said leaf spring 7 presses against the column tube 2 directly or with the interposition of at least one bearing body 17. In this context, the leaf spring 7 presses exclusively with its side facing the column tube 2 against the column tube 2. This applies both to the case in which the leaf spring 7 presses directly against the column tube 2 as well as to the case in which this pressing occurs with the interposition of the one or more bearing bodies 17. Generally, there is advantageously provision that the leaf spring 7 presses, with its support faces spaced apart from one another in the circumferential direction 10 of the column tube 2, against the column tube 2 at the points 11, 12 which are spaced apart from one another in the circumferential direction 10 of the column tube. The corresponding support faces of the leaf spring 7 can be, but do not have to be, arranged in the area just before the ends 31 of the leaf spring 7. The same symmetry as in the case of the points or areas 11, 12 at which the leaf spring 7 or its support faces bear against the column tube 2 preferably applies to the arrangement of the support faces.

As is also implemented in the individual exemplary embodiments, there is advantageously provision that the opening 14 in the carrier body 4 is bounded exclusively by walls which are parallel to one another. These may be, for example, walls which are parallel to one another in pairs. The walls are generally part of the carrier body 4.

The invention claimed is:

1. A steering column for a motor vehicle, comprising:
   a carrier body configured to couple the steering column to a body of the vehicle;
   a column tube slidably mounted in said carrier body and configured to be slidably moveable in a longitudinal direction of said column tube, said column tube having at least one section of an outer surface portion thereof that is cylindrical shaped;
   a steering spindle rotatably mounted in said column tube and having a longitudinal central axis parallel to the longitudinal direction of said column tube, said steering spindle configured to be rotatable about its longitudinal central axis relative to said column tube; and
   at least one leaf spring having at least a first support face and a second support face, said leaf spring being coupled to said carrier body such that said first and second support faces are spaced apart from each other along an outer circumferential direction of said column tube and apply a force against said cylindrical outer portion of said column tube in a transverse direction orthogonally to the longitudinal central axis of said steering spindle, wherein the force from the at least one leaf spring is applied at a first point and a second point, the first and second points being spaced apart from one another in the outer circumferential direction of said column tube.

2. The steering column of claim 1, further comprising at least one bearing body disposed between each of said first and second support faces of said leaf spring and said column tube, such that said first and second faces directly apply force against the at least one bearing body, and the at least one bearing body applies the force against said cylindrical outer portion of said column tube.

3. The steering column of claim 2, wherein said at least one bearing body is at least partially made of plastic material.

4. The steering column of claim 3, wherein said at least one bearing body is wedge shaped and has at least one curved partial cylindrical surface configured to be a bearing surface against said cylindrical outer portion of said column tube.

5. The steering column of claim 1, further comprising a motor-operated longitudinal adjustment drive operatively coupled between said column tube and said carrier body, and configured to slidably extend or retract said column tube in said longitudinal direction.

6. The steering column of claim 5, wherein said motor-operated longitudinal adjustment drive is configured to maintain a set longitudinal position of said column tube with respect to said carrier body.

7. The steering column of claim 1, wherein said first and second support faces of said leaf spring apply a force against said column tube at each of said first and second points.

8. The steering column of claim 1, wherein a side of said column tube facing said leaf spring rests on said carrier body, and wherein a lubricant film is disposed there between.

9. The steering column of claim 1, wherein said leaf spring is disposed in an opening defined in said carrier body, said opening being configured to permit an installation of said leaf spring from outside of said carrier body into said opening and against said column tube mounted in said carrier body.

10. The steering column of claim 9, wherein a footprint of said opening is at least as large as a footprint of said leaf spring.

11. The steering column of claim 9, wherein said opening is bounded at least by a plurality of walls that are parallel to each other.

12. The steering column of claim 1, wherein said leaf spring is held in place in said carrier body by at least one threaded fastener supporting said leaf spring on a side of said leaf spring facing away from said column tube.

13. The steering column of claim 1, wherein said leaf spring extends, at most, over half of the circumference of said cylindrical outer portion of said column tube.

* * * * *